United States Patent
Shukla et al.

(10) Patent No.: US 9,392,536 B2
(45) Date of Patent: Jul. 12, 2016

(54) SYSTEMS AND METHODS FOR CELL SELECTION AND RESELECTION BY IMPROVING SYSTEM INFORMATION READING PROCEDURE

(71) Applicant: APPLE INC., Cupertino, CA (US)

(72) Inventors: Umesh K. Shukla, Cupertino, CA (US); Aravind Radhakrishnan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/291,432

(22) Filed: May 30, 2014

(65) Prior Publication Data

US 2015/0351011 A1    Dec. 3, 2015

(51) Int. Cl.
*H04W 48/16* (2009.01)

(52) U.S. Cl.
CPC .................................... *H04W 48/16* (2013.01)

(58) Field of Classification Search
CPC ... H04W 24/02; H04W 60/00; H04W 76/028; H04W 36/08; H04W 4/005; H04W 28/0215; H04W 4/001; H04W 48/02; H04W 28/0289; H04W 72/0486; H04W 28/08; H04W 36/30; H04W 36/04; H04W 485/20; H04W 84/045; H04W 48/16; H04W 48/18; H04W 48/20; H04W 88/06; H04W 48/12; H04W 40/36; Y02B 60/50; H04L 12/26
USPC .......... 455/423, 436, 434; 370/331, 231, 392, 370/235, 242, 332, 252
See application file for complete search history.

(56) References Cited

U.S. PATENT DOCUMENTS

| | | | | |
|---|---|---|---|---|
| 6,067,460 | A * | 5/2000 | Alanara et al. | 455/574 |
| 2007/0260851 | A1* | 11/2007 | Taha | H04W 52/0229 712/204 |
| 2008/0170526 | A1* | 7/2008 | Narang | H04W 52/0216 370/311 |
| 2011/0103249 | A1* | 5/2011 | Kim | H04W 24/10 370/252 |
| 2012/0135731 | A1* | 5/2012 | Rangaiah et al. | 455/434 |
| 2012/0170515 | A1* | 7/2012 | Patil | H04W 48/12 370/328 |
| 2013/0012215 | A1* | 1/2013 | Seo | 455/450 |

(Continued)

OTHER PUBLICATIONS

3GPP TS 36.331 V11.0.0 (2912-06) $3^{rd}$ Generation Partnership Project; Technical Specification Group Radio Access Network; Evolved Universal Terrestrial Radio Access (E-UTRA); Radio Resource Control (RRC); Protocol Specification (Release 11).*

*Primary Examiner* — Patrick Edouard
*Assistant Examiner* — B. M. M. Hannan
(74) *Attorney, Agent, or Firm* — Fay Kaplun & Marcin, LLP

(57) ABSTRACT

Described herein are methods performed by user equipment ("UE") for carrier aggregation deployment and organization in unlicensed bands. The method includes initiating a cell selection process with a target cell, wherein the target cell sends a plurality of information blocks, receiving a first information block, prior to reading a second information block, determining whether the target cell is suitable for the UE to camp on based on the first information block, and terminating the cell selection process when the target cell is determined to be unsuitable for camping based on the first information block. The terminating may include comparing data from the first information block to data stored in a database. The method further includes determining whether the UE is in a stationary state or is in a state of motion, and using this information to improve cell selection delay on target cell.

18 Claims, 6 Drawing Sheets

(56) References Cited

U.S. PATENT DOCUMENTS

| | | | |
|---|---|---|---|
| 2013/0109391 A1* | 5/2013 | Lee et al. ...................... 455/436 |
| 2014/0051447 A1* | 2/2014 | Li ....................... H04W 76/028 |
| | | 455/437 |
| 2014/0056243 A1* | 2/2014 | Pelletier et al. ............... 370/329 |
| 2014/0153516 A1* | 6/2014 | Young et al. .................. 370/329 |
| 2014/0226623 A1* | 8/2014 | Seo ................... H04W 36/0055 |
| | | 370/331 |
| 2015/0078334 A1* | 3/2015 | Peruru .................. H04W 48/10 |
| | | 370/331 |

* cited by examiner

Fig. 1

System Information Block Data 100

| SIB-1  | Cell access related parameters and scheduling of other SIBs |
| SIB-2  | Common and shared channel configuration, RACH related configuration are present |
| SIB-3  | Parameters required for intra-frequency, inter-frequency and I-RAT cell re-selections |
| SIB-4  | Information regarding INTRA-frequency neighboring cells (E-UTRA) |
| SIB-5  | Information regarding INTER-frequency neighboring cells (E-UTRA) |
| SIB-6  | Information for re-selection to INTER-RAT (UTRAN cells) |
| SIB-7  | Information for re-selection to INTER-RAT (GERAN cells) |
| SIB-8  | Information for re-selection to INTER-RAT (CDMA2000) |
| SIB-9  | Information related to Home eNodeB (FEMTOCELL) |
| SIB-10 | ETWS (Earthquake and Tsunami Warning System) information (Primary notification) |
| SIB-11 | ETWS (Earthquake and Tsunami Warning System) information (Secondary notification) |
| SIB-12 | Commercial Mobile Alert Service (CMAS) information |
| SIB-13 | Contains the information required to acquire the MBMS control information associated with one or more MBSFN areas |

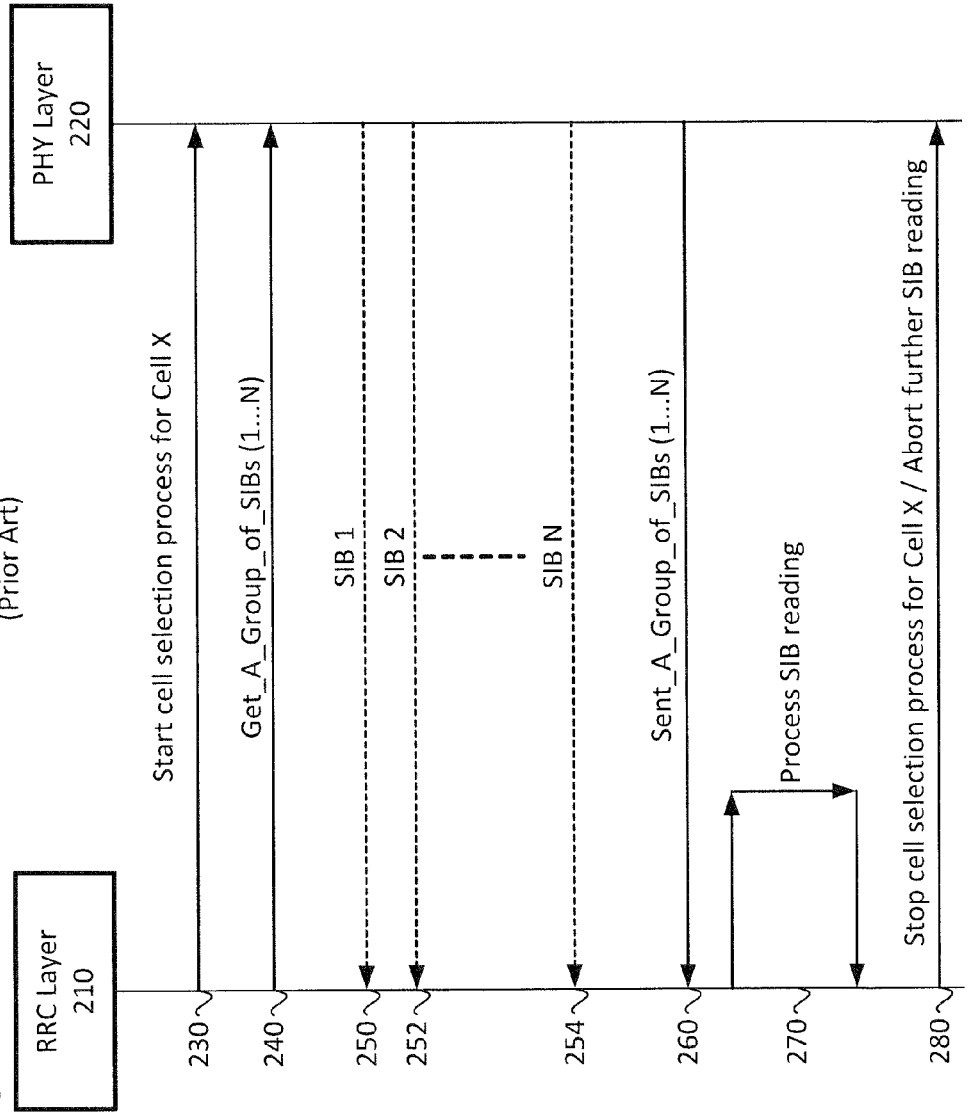

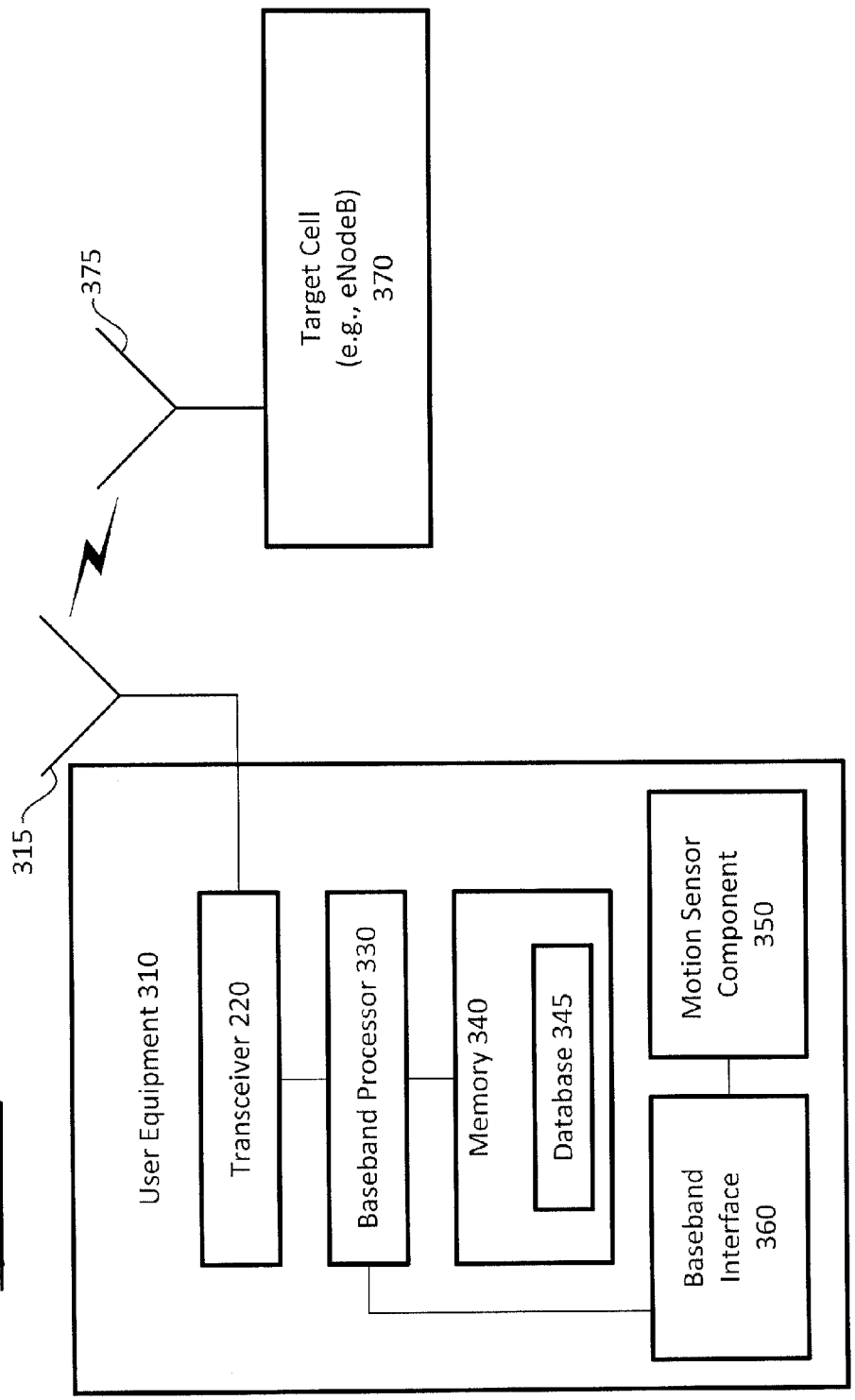

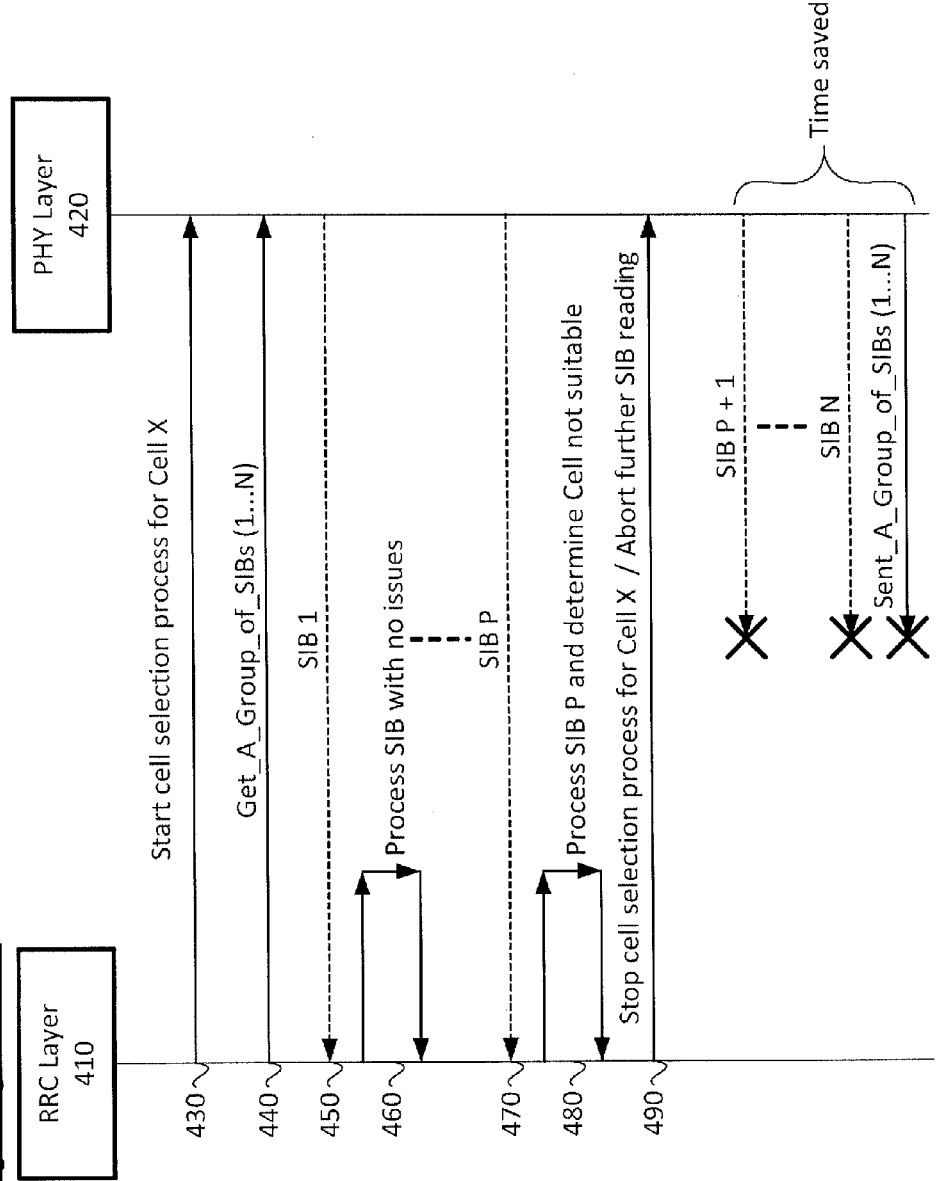

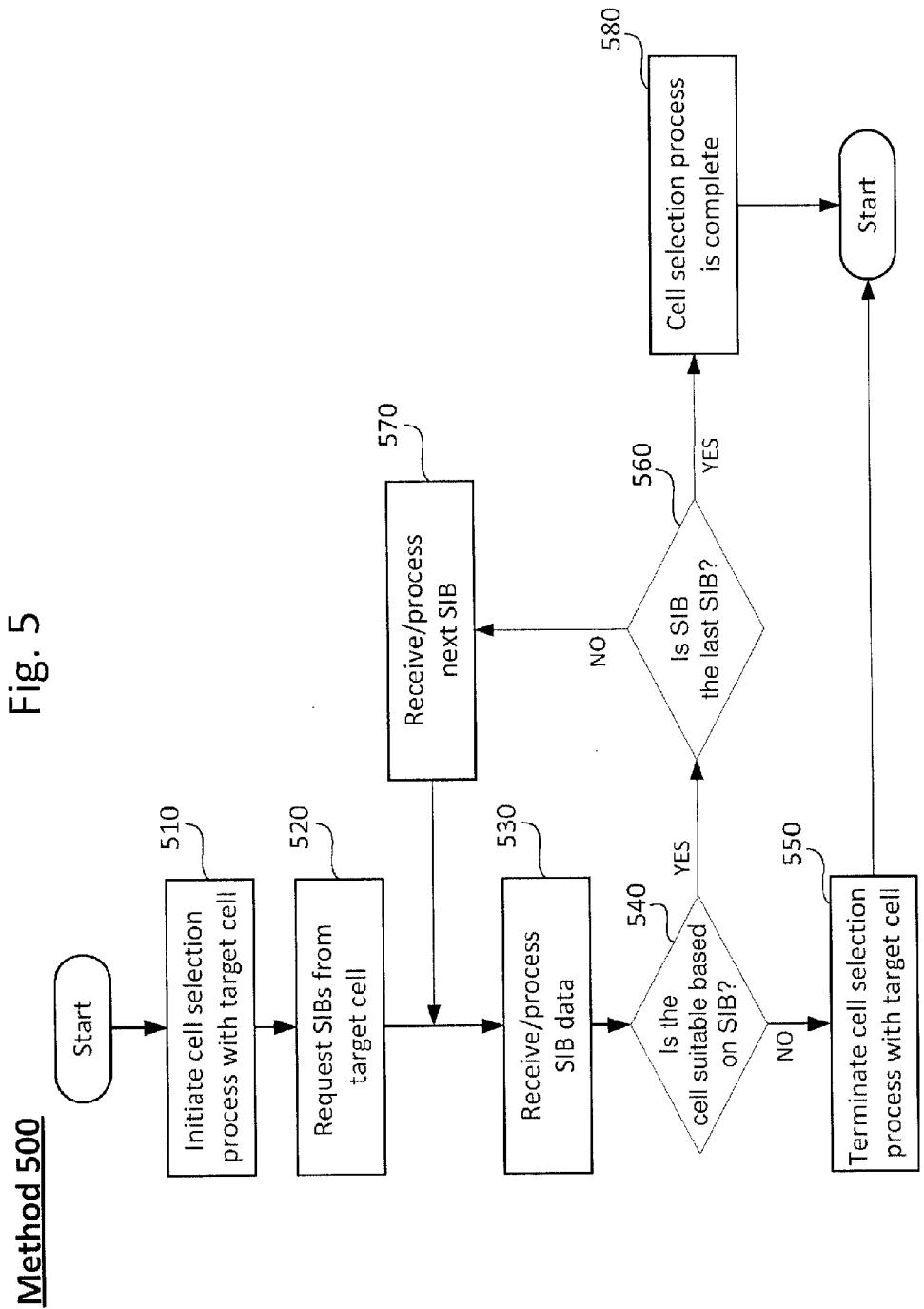

SYSTEMS AND METHODS FOR CELL SELECTION AND RESELECTION BY IMPROVING SYSTEM INFORMATION READING PROCEDURE

BACKGROUND

When a user powers on a user equipment ("UE"), in most case the UE is under a circumstance wherein it recognizes several base stations or cells (e.g., enhanced-Node B) around it. In some cases the UE may be in the coverage areas not only of the multiple base stations from one particular system operator, but also by multiple base stations from multiple system operators. Out of those many base stations, the UE may be able to register, or "camp," on to only one specific base station. In order to determine which specific base station the UE is to register on, the UE goes through a decision making process to pick up a specific base station in which to register. Accordingly, this decision making process is called a "cell selection process."

After the UE has selected a public land mobile network ("PLMN") and performed the cell selection process, the UE may discover an appropriate cell camp. While camping on the cell, the UE may acquire a broadcast and the UE may record its presence in the area. After which, the UE may then receive paging information to be used to notify the UE of any incoming calls. Furthermore, the UE may establish a connection to the radio resource control ("RRC"). While camped on a cell, the UE may continuously measure the parameters of its current cell, as well as the neighboring cells (e.g., target cells) in order to camp on the strongest cell. Key parameters of the target cells are included within master information blocks ("MIBs") and system information block ("SIBs"), which may be measured and uploaded to RRC layer of the UE to allow for control decisions to be made.

SUMMARY

Described herein are apparatus, systems and methods for cell selection and reselection by improving system information reading procedure. The method includes, at a UE, initiating a cell selection process with a target cell, wherein the target cell sends a plurality of information blocks, receiving the plurality of the information blocks, reading a first information block of the plurality of information blocks, prior to reading a second information block of the plurality of information blocks, determining whether the target cell is suitable for the UE to camp on based on the first information block, terminating the cell selection process when the target cell is determined to be unsuitable for camping based on the first information block, reading the second information block when it is determined that the target cell is suitable for camping based on the first information block, prior to reading a third information block, determining whether the target cell is suitable for the UE to camp on based on the second information block, and terminating the cell selection process when the target cell is determined to be unsuitable for camping based on the second information block.

DESCRIPTION OF THE DRAWINGS

FIG. 1 shows exemplary system information block data provided by one or more target cells during a search performed by a UE.

FIG. 2 shows a signaling diagram of a typical exchange of information between an RRC layer and a physical ("PHY") layer of the UE during a conventional cell selection process.

FIG. 3 shows an exemplary system for improved system information reading procedure during cell selection and reselection according to an embodiment described herein.

FIG. 4 shows an exemplary signaling diagram for improved system information reading procedure during cell selection and reselection by according to an embodiment described herein.

FIG. 5 shows an exemplary method for improved system information reading procedure during cell selection and reselection corresponding to the signaling diagram of FIG. 4.

DETAILED DESCRIPTION

Figure 6:
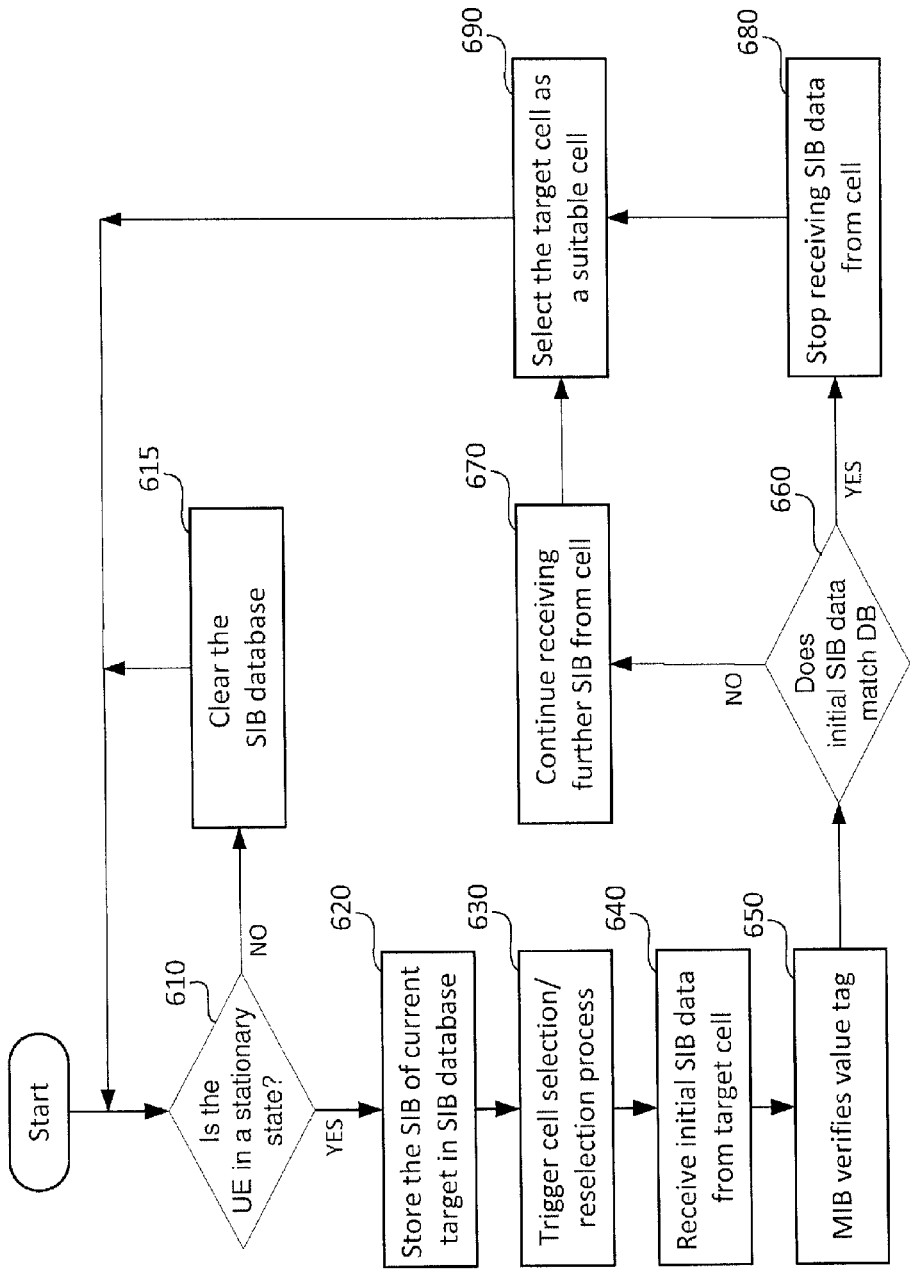
FIG. 6 shows a further exemplary method for improved system information reading procedure during cell selection and reselection based on a stationary state of the UE according to an embodiment described herein.

Described herein are systems and methods for cell selection and reselection by improving system information reading procedure. A method comprising at a user equipment ("UE") initiating a cell selection process with a target cell, wherein the target cell sends a plurality of information blocks, receiving a first information block, prior to reading a second information block, determining whether the target cell is suitable for the UE to camp on based on the first information block, and terminating the cell selection process when the target cell is determined to be unsuitable for camping based on the first information block.

Further described herein is a user equipment ("UE") comprising a non-transitory memory having a program stored thereon, and a processor executing the program, wherein the execution of the program causes the processor to perform operations comprising initiating a cell selection process with a target cell, wherein the target cell sends a plurality of information blocks, receiving a first information block, prior to reading a second information block, determining whether the target cell is suitable for the UE to camp on based on the first information block, and terminating the cell selection process when the target cell is determined to be unsuitable for camping based on the first information block.

Further described herein is a method comprising, at a user equipment ("UE"), determining the UE is in a stationary state; initiating a cell selection process with a target cell, wherein the target cell sends a plurality of information blocks; receiving a first information block of the plurality of information blocks; comparing data from the first information block to data stored in a database; and when the data from the first information block matches data stored in the database, terminating processing of further information blocks of the plurality of information blocks, and identifying the target cell as a suitable cell.

Further described herein is a user equipment ("UE") comprising a non-transitory memory having a program stored thereon, and a processor executing the program, wherein the execution of the program causes the processor to perform operations comprising determining the UE is in a stationary state, initiating a cell selection process with a target cell, wherein the target cell sends a plurality of information blocks, receiving a first information block of the plurality of information blocks, comparing data from the first information block to data stored in a database and when the data from the first information block matches data stored in the database, terminating processing of further information blocks of the plurality of information blocks, and identifying the target cell as a suitable cell The exemplary embodiments may be further understood with reference to the following description and the appended drawings, wherein like elements are referred to with the same reference numerals. The exemplary embodiments show systems and methods for cell selection and reselection by improving system information reading procedure. As will be described in greater detail below, exemplary embodiments described herein may provide a pre-emptive mechanism for a mobile device such as a user equipment ("UE") to achieve faster cell selection and reselection. For instance, the exemplary systems and methods may allow the UE to quickly move away from undesirable target cells and, instead, focus on desirable target cells for the UE.

The exemplary embodiments are described with reference to a UE performing cell selection and re-selection autonomously in mobility scenarios. More specifically, once the UE decides to select a cell, the UE then determines if a target cell is either suitable or acceptable before the UE can camp on the cell. Typically, this decision process takes place after the UE reads system information of the target cell.

A suitable target cell may be defined as a cell on which the UE may camp on to obtain normal service. The suitable cell may fulfill certain requirements such as the cell is part of a selected PLMN, or of a PLMN equivalent as considered by the UE according to information provided by the Non-Access-Stratum ("NAS") protocol. Additional requirements may include that the cell is not barred, that the cell is not part of a list of forbidden Location Areas ("LAs") for roaming, that the cell selection criteria are fulfilled, etc.

An acceptable target cell may be defined as a cell on which the UE may camp to originate limited service, such as originate emergency calls. The acceptable cell may fulfill certain requirements such as the cell is not barred and the cell selection criteria are fulfilled. Accordingly, the minimum set of requirements for the acceptable cell may be the requirements for initiating an emergency call in a Universal Terrestrial Radio Access Network ("UTRAN").

FIG. 1 shows exemplary SIB data 100 provided by one or more target cells during a search performed by a UE. For instance, SIB1 may contain information relevant when evaluating if a UE is allowed to access a cell. Furthermore, SIB1 may contain cell access related information (e.g., a PLMN identity list, tracking area code, cell identity, etc.), information for cell selection (e.g., minimum required Rx level in the cell and offset), p-Max, frequency band indicator, scheduling information, time-division duplex ("TDD") configuration, SI-window length and system information value tag, etc. SIB2 may contain radio resource configuration information that is common for all UEs. This configuration information includes cell access barring information, random access channel ("RACH") related parameters, idle mode paging configurations, physical uplink control channel ("PUCCH") and physical uplink shared channel ("PUSCH") configurations, uplink ("UL") power control and sounding reference signal configurations, UL carrier frequency/bandwidth, etc.

Examples of various radio access technologies ("RATs") may include Universal Mobile Telecommunications System ("UMTS"), Global System for Mobile communications ("GSM"), and Long-Term Evolution ("LTE"). Within each of the RATs, important system information messages may be different. For instance, in UMTS networks, there are master information blocks ("MIBs") and system information blocks (e.g., SIB1, SIB3). For GSM networks, there are system information messages (e.g., SI1, SI2). For LTE networks, there are similar MIB, SIB1, SIB2, SIB3 elements. Regardless of the various RATs implemented, system information messages, or SI messages, may be scheduled to be transmitted at different instances of time. Due to the fact that there may be multiple SI messages, the UE typically takes considerable amount of time in reading each of the SIs from target cells.

FIG. 2 shows a signaling diagram 200 of a typical exchange of information between an RRC layer 210 and a physical ("PHY") layer 220 of a UE during a conventional cell selection process. In conventional designs, the RRC layer 210 may instruct the PHY layer 220 of the UE to read system information. As illustrated in the signaling diagram 200, the RRC layer 210 may start 230 the cell selection process with a target cell of Cell X. The RRC layer 220 may then request 240 from the PHY layer 220 to receive a group of SIBs. The RRC layer 210 may then wait until a predetermined number of SIBs have been received at the UE (e.g., SIB 1 through SIB N) from Cell x. Specifically, the PHY layer 220 may send SIB 1 250, followed by sending SIB 2 252, and so forth through SIB N 254. Upon sending the final information block, SIB N 254, the PHY layer 220 may inform 260 the RRC layer 240 that the group of blocks (SIB 1 though SIB N) has been sent.

According to this conventional process, the UE will wait until the final block is received until the UE reads and processes 270 the information within each of the SIBs. It is only after the UE has read each of the SIBs until the UE determines whether the cell selection process should be terminated, wherein the RRC layer 210 sends a message 280 to the PHY layer 220 to stop the cell selection process. However, in several cases, the UE waiting to read and process all of the SIBs may not be required. For instance, information within the first SIB, or one of the first SIBs, may have rendered the target cell unsuitable. Accordingly, in this conventional scenario, the UE is wasting a considerable amount of time and battery power reading system information on a target cell on which the UE will ultimately not camp.

FIG. 3 shows an exemplary system 300 for improved system information reading procedure during cell selection and reselection according to an embodiment described herein. The system 300 may include a UE 310 in communication with a target cell 370 (e.g., eNodeB). The UE 310 may include an antenna 315 connected to a transceiver 320, which is connected to a baseband processor 330. The UE 310 may further include a memory 340 including a SIB database 345 that is accessible by the baseband processor 330. As will be described in greater detail below, the UE 310 may further include a motion sensor component 350 and a baseband interface 360 connecting the motion sensor component 350 to the baseband processor 330. Those skilled in the art will understand that the UE 310 may also include other components that are not shown in FIG. 3, for example, an application processor, a Bluetooth/WiFi transceiver, a display (e.g., a touchscreen), an input device (e.g., keypad), etc.

The transceiver 320 and the baseband processor 330 may be used to perform operations such as, but are not limited to, scanning the network for target cells, such as the target cell 370, exchanging information with one or more target cells, etc. For instance, the exemplary target cell 370 may transmit signals via an antenna 375 that may be received by the antenna 315 of the UE 310.

As noted above, the exemplary systems and methods described herein may allow for faster cell selection and reselection. In addition, the systems and methods may provide improved latency in higher layer applications that involve cell selection and reselection. Furthermore, the systems and methods may provide power saving advancements by eliminating unnecessary reading and processing of every SIB of a target cell that is not suitable for cell selection.

FIG. 4 shows an exemplary signaling diagram 400 for improved system information reading procedure during cell selection and reselection according to an embodiment described herein. The operations performed by the method 400 will be described in reference to the system 300 and its components described above with reference to FIG. 3. It may be considered that the baseband processor 330 implements at the RRC layer 410 and the transceiver 320 implements the PHY layer 420. However, the exemplary embodiments are not limited to such an implementation, as the UE may implement network layers via any of a variety of hardware components. It is also considered that the RRC layer 410 and the PHY layer 430 may continue to operate as parallel tasks. Accordingly, the exemplary signaling diagram 400 may not have any impact on the parallelism of these two tasks.

The baseband processor 330 of the UE 310 implementing the RRC layer 410 may initiate a cell selection process by sending a message 430 to the transceiver 320 implementing the PHY layer 420. In this example, it may be considered that the target cell 370 is the Cell X for which the cell selection process is initiated. The RRC layer 410 sends a request 440 to the PHY layer 420 to request a group of SIBs from the target cell 370.

The PHY layer 420 then sends a message 450 with the first SIB (SIB 1) to the RRC layer 410. Immediately upon receipt of message 450, the RRC layer 410 may read and process 460 the information of SIB 1. In this example, it is considered that SIB 1 has no issues, e.g., there is no information in SIB 1 that indicates the cell 370 is an unsuitable cell. While not specifically shown in FIG. 4, it may be considered that additional messages having SIB 2, SIB 3, etc., are sent from the PHY layer 420 to the RRC layer 410 and, as each of these messages are received, the RRC layer 410 reads and processes the SIB data from the message. Continuing with this pattern, the PHY layer 420 may send a message 470 to the RRC layer 410 including SIB P. The RRC layer 410 may read and process 480 the SIB P and then determine that the target cell 370 is not a suitable cell based on the data from SIB P.

According to the exemplary embodiments of the systems and methods described herein, the reading of the data of the first SIB occurs prior to, or contemporaneously with, the RRC layer 410 receiving a further system information block (e.g., SIB 2). In other words, before reading or processing the data from any subsequent SIBs (e.g., SIB 2 through SIB N), the RRC layer 410 determines whether any issues are present in the first SIB regarding the suitability of the target cell 370. Therefore, as opposed to waiting to read and process each SIB until all SIBs are received, the RRC layer 410 may become aware of any such suitability issues as early as possible. As illustrated in FIG. 4, the exemplary RRC layer 410 may eliminate receiving, reading and processing of data from SIBs after it is determined that SIB P indicated that cell 370 is unsuitable (e.g., SIB P+1 through SIB N).

This is accomplished by the RRC layer 410 terminating the cell selection process by sending a stop cell selection/abort further SIB reading message 490 when the target cell 370 is determined to be unsuitable. Upon terminating the cell selection process, the PHY layer 420 may stop receiving any further SIBs from the target cell 370. Furthermore, upon terminating the cell selection process with the first target cell 370, the UE 310 may then either return to the currently camped cell if it is suitable, or the UE 310 may then initiate a new cell selection process with a different target cell of the network.

FIG. 5 shows an exemplary method 500 for improved system information reading procedure during cell selection and reselection corresponding to the signaling diagram 400 of FIG. 4. Furthermore, the operations performed by the method 400 will be described in reference to the system 300 and its components described above with reference to FIG. 3.

In step 510, the UE 310 may initiate a cell selection process with a target cell. Once the process has been initiated, in step 520 the UE 310 may request SIBs from the target cell. In step 530, the baseband processor 330 of the UE 310 may receive and process a first SIB (e.g., SIB 1).

At step 540, the baseband processor 330 may determine whether the target cell is a suitable cell based on the information from the first SIB. If the target cell is determined to be unsuitable, the method 500 may advance to step 550 wherein the UE 310 terminates the cell selection process with the target cell and the method 500 ends. If the SIB indicates that the target cell is suitable, the method may advance to step 560.

At step 560, the baseband processor 330 may determine whether the current SIB (e.g., SIB 1) is the last SIB from the target cell. If the current SIB is determined to be the final SIB, the method 500 may advance to step 580 wherein the cell selection process is complete and the method 500 ends. If the current SIB is determined to not being the final SIB, the method may advance to step 570 wherein the baseband processor 330 receives and processes the next SIB (e.g., SIB 2). Upon receiving the next SIB (e.g., SIB 2), the method may return to step 540, wherein the baseband processor 330 determines is the target cell is suitable based on the new information from the current SIB (e.g., SIB 2). Thus, the method 500 may process each current SIB, and prior to reading information from the next SIB, the baseband processor 330 may determine whether the target cell is suitable for the UE 310 to camp on based on the current SIB.

FIG. 6 shows a further exemplary method 600 for improved system information reading procedure during cell selection and reselection based on a stationary state of the UE 310 according to an embodiment described herein. Similar to FIG. 4, the operations performed by the method 600 will be described in reference to the system 300 and its components described above with reference to FIG. 3. As will described in detail below, the exemplary method 600 may utilize the SIB database 345 and the motion sensor component 350 of the UE 310, wherein the method 600 may be implemented while the UE 310 is stationary.

In step 610, the motion sensor component 350 of the UE 310 may determine a stationary state of the UE 310. Specifically, the motion sensor component 350 may determine if the UE 310 is in either a stationary state or an in-motion state. The motion sensor component 350 may communicate the motion determination with the baseband processor 330 via the baseband interface 360. If the UE 310 is determined to be in motion, the method 600 may advance to step 615, wherein the UE 310 may clear the SIB database 345 and the method 600 may return to monitoring the UE 310 in step 610. If the UE 310 is determined to be in a stationary state, the method 600 may advance to step 620.

In step 620, once the UE 310 is determined to be in a stationary state, the baseband processor 330 may store the SIBs of a current cell within the SIB database 345 of the memory 340. For instance, the baseband processor 330 may store a combination of data, such as, but not limited to, frequency data, primary scrambling code ("PSC") data, etc. of the current cell. As noted above, this combination stored within the SIB database 345 may remain valid until the motion state of the UE 310 changes.

In step 630, the UE 310 may trigger a cell selection or reselection process while the UE remains in a stationary state. For instance, variations in the radio frequency ("RF") signals may trigger a cell selection process, wherein the UE 310 attempts to select a new or a previously used target cell.

In step 640, the UE 310 may receive initial SIB data from the target cell. For instance, the initial SIB data from the target cell may include a combination of data such as the frequency and PSC of the target cell.

In step 650, the MIB may verify if a value tag has been changed. The UE 310 may perform this verification when the MIB is receives. The UE 310 may compare the value tag in the MIB with the value tag stored for the cell and PLMN. If the value tag in the MIB matches the stored value tag for the cell and PLMN, the UE 310 may use the stored SIBs and scheduling blocks stored for this cell and this PLMN. If the value tags differ, or if no information elements (IEs) are stored for the MIB, then the UE 310 may store the value tag for the MIB and any scheduling information included in the MIB.

In step 660, the UE 310 may determine whether or not the initial SIB data received from the target cell is present in the SIB database 345. If the initial SIB data is not in the database 345, the method 600 may advance to step 670 wherein the UE 310 may continue to receive further SIB data from the target cell. However, if the initial SIB data is in the database 345, the method 600 may advance to step 680 wherein the UE 310 may stop receiving further SIB data from the target cell, as there is no need to read any further SIBs. For instance, the database 345 may only include the target cells that have already been determined to be suitable. Thus, if the SIB data matches SIB data in the database 345, the target cell has been previously determined to be suitable and there is no reason to continue to read any further SIBs.

In step 690, the UE 310 may select the target cell as a suitable cell based on either the database entry from step 680 or the further SIB data from step 670. Once the new target cell is selected, the method 600 may return to step 610, wherein the motion sensor component 350 may determine a stationary state of the UE 310.

The exemplary systems and methods described above may be implemented in any number of scenarios to improve the overall operations of the UE 310 in the network. One scenario may be a scenario in which PLMN searching during a "power on" process or when the UE 310 is out of coverage. Accordingly, the UE 310 may typically be required to read the SIs of a target cell in order to camp on the target cell during the PLMN search procedure. The exemplary systems and methods may eliminate any unwanted call in a much more efficient manner, and thus, the PLMN search procedure may be accomplished in less time. Furthermore, during a stationary scenario, the PLMN search may be finished even faster as the UE 310 may be required to read the least number of SIs before cell selection.

A further scenario may be a scenario of performing a home PLMN ("HPLMN") scan in roaming. In roaming scenarios, the UE may periodically search for high-priority PLMN ("HPPLMN") in order to find a HPLMN or the best roaming part. Accordingly, the UE 310 may find suitable cells faster using the exemplary systems and methods described above. For instance, the UE 310 may utilize the signaling diagram 400 when the UE 310 is mobile and either the signaling diagram 400 or the method 600 when the UE 310 is in a stationary state.

A further scenario may be a scenario during a limited service search. When any suitable target cell is not present to a UE, the UE may search for an acceptable cell on any PLMN in order to allow for limited service, such as the placement of emergency calls. If a target cell is barred or if the SI indicates that the cell is only for operator use, then the UE is restricted from camping on this target cell for emergency calls. Accordingly, if a particular SI indicates that the cell cannot be used by the UE for limited service, the UE may stop reading any further SIBs of that cell and initiate a cell selection process with a different target cell.

A further scenario may be a scenario after the end of a voice call and/or data call. In this scenario, a UE may attempt to acquire the best target cell on the current frequency after the voice/data call ends and the RRC connection is released. By utilizing the systems and methods described above, the UE may acquire the best target cell much faster, while reducing the chances of a page being missed.

A further scenario may be a scenario during a circuit switch fallback ("CSFB"). Typically, many networks redirect UEs to some frequency in circuit switch call-supported RATs (e.g., UMTS, GSM, etc.) from LTE after a UE tries to originate a voice call or receives a page for a voice call. During CSFB, the UE attempts to acquire a target cell on a given frequency, or some other frequency if the acquisition fails on a redirected frequency. The UE may then read the SIs before the UE can begin signaling with voice-supporting RATs. A large amount of time is typically devoted by the UE to reading this SIs, which in turn leads to a greater delay in call setup. By utilizing the systems and methods described above, the UE may reduce the overall call setup delay.

A further scenario may be a scenario during a redirection command from the network. For instance, during an active connection, the network may redirect the UE to another frequency or another RAT. Accordingly, the UE may be typically required to go to the redirected frequency or RAT in order to resume the ongoing call. By utilizing the systems and methods described above, the UE may reduce the overall call setup delay through improved call quality and throughput.

A further scenario may be a scenario involving paging performance, OOS recovery time in idel, and PCH (UMTS) states. By utilizing the systems and methods described above, the UE may reduce the time spent reading SIs in selection/reselection procedures, thereby providing faster OOS recovery and improved paging performance.

A further scenario may be a scenario involving reselections during data transfers in Cell_FACH in UMTS networks. By utilizing the systems and methods described above, the UE may reselect a better cell while data is ongoing in Cell_FACH/HS-FACH/HS-RACH state, thereby improving overall data throughput in these states as both the reselection process and the resumption of data transmission would be completed much faster.

A further scenario may be a scenario involving periodic and/or manual searchers for closed subscriber group ("CSG") cells, such as a femtocell configured in CSG mode. In this scenario, a UE may perform periodic searches while camped on a macrocell in order to look for CSG cells. Accordingly, the UE may implement the method 400 while the UE is mobile to quickly find suitable target CSG cells. Furthermore, when the UE is stationary, the UE may implement the method 600 to quickly camp on CSG cell.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE"):
   initiating a cell selection process with a target cell, wherein the target cell sends a plurality of information blocks;
   receiving the plurality of the information blocks;

reading a first information block of the plurality of information blocks;
prior to reading a second information block of the plurality of information blocks, determining whether the target cell is suitable for the UE to camp on based on the first information block;
terminating the cell selection process when the target cell is determined to be unsuitable for camping based on the first information block;
reading the second information block when it is deteimined that the target cell is suitable for camping based on the first information block;
prior to reading a third information block, determining whether the target cell is suitable for the UE to camp on based on the second information block; and
terminating the cell selection process when the target cell is determined to be unsuitable for camping based on the second information block.

2. The method of claim 1, further comprising:
upon terminating the cell selection process, camping on a previously camped on cell.

3. The method of claim 1, further comprising:
upon terminating the cell selection process, initiating a second cell selection process with a second target cell.

4. The method of claim 1, wherein the first information block is read at a radio resource control ("RRC") layer from a physical ("PHY") layer, and the RRC and PHY layers operate as parallel tasks.

5. A user equipment ("UE"), comprising:
a non-transitory memory having a program stored thereon; and
a processor executing the program, wherein the execution of the program causes the processor to perform operations comprising:
initiating a cell selection process with a target cell, wherein the target cell sends a plurality of information blocks;
receiving the plurality of the information blocks
reading a first information block of the plurality of information blocks;
prior to reading a second information block of the plurality of information blocks,
determining whether the target cell is suitable for the UE to camp on based on the first information block;
terminating the cell selection process when the target cell is determined to be unsuitable for camping based on the first information block;
reading the second information block when it is determined that the target cell is suitable for camping based on the first information block;
prior to reading a third information block determining whether the target cell is suitable for the UE to camp on based on the second information block; and
terminating the cell selection process when the target cell is determined to be unsuitable for camping based on the second information block.

6. The UE of claim 5, wherein the operations further comprise:
upon terminating the cell selection process, camping on a previously camped on cell.

7. The UE of claim 5, wherein the operations further comprise:
upon terminating the cell selection process, initiating a second cell selection process with a second target cell.

8. The UE of claim 5, wherein the first information block is read at a radio resource control ("RRC") layer from a physical ("PHY") layer, and the RRC and PHY layers operate as parallel tasks.

9. A method, comprising:
at a user equipment ("UE"):
determining the UE is in a stationary state;
initiating a cell selection process with a target cell, wherein the target cell sends a plurality of information blocks;
receiving the plurality of information blocks;
reading the first information block of the plurality of information blocks;
prior to reading the second information block of the plurality of information blocks, comparing data from the first information block to data stored in a database; and
when the data from the first information block matches data stored in the database,
terminating processing of further information blocks of the plurality of information blocks,
identifying the target cell as a suitable cell;
reading the second information block when it is determined that the target cell is suitable for camping based on the first information block;
prior to reading a third information block, determining whether the target cell is suitable for the UE to camp on based on the second information block; and
terminating the cell selection process when the target cell is determined to be unsuitable for camping based on the second information block.

10. The method of claim 9, further comprising:
storing data in the database relating to information blocks of a cell that the UE is currently camped on.

11. The method of claim 9, further comprising:
when the data from the first information block does not match data stored in the database,
processing the further information blocks of the target cell, and
determining whether the target cell is a suitable cell based on the plurality of information blocks.

12. The method of claim 11, further comprising:
storing, when the target cell has been determined to be a suitable cell, data from the first information block in the database.

13. The method of claim 9, further comprising:
determining the UE is in a state of motion; and
clearing the database.

14. A user equipment ("UE"), comprising:
a non-transitory memory having a program stored thereon; and
a processor executing the program, wherein the execution of the program causes the processor to perform operations comprising:
determining the UE is in a stationary state;
initiating a cell selection process with a target cell, wherein the target cell sends a plurality of information blocks;
receiving the plurality of information blocks;
reading the first information block of the plurality of information blocks;
prior to reading the second information block of the plurality of information blocks, comparing data from the first information block to data stored in a database; and
when the data from the first information block matches data stored in the database, terminating processing of further information blocks of the plurality of information blocks, and
identifying the target cell as a suitable cell;
reading the second information block when it is determined that the target cell is suitable for camping based on the first information block;
prior to reading a third information block, determining whether the target cell is suitable for the UE to camp on based on the second information block; and
terminating the cell selection process when the target cell is determined to be unsuitable for camping based on the second information block.

15. The UE of claim 14, further comprising:
storing data in the database relating to information blocks of a cell that the UE is currently camped on.

16. The UE of claim 14, further comprising:
when the data from the first information block does not match data stored in the database,
    processing the further information blocks of the target cell, and
    determining whether the target cell is a suitable cell based on the plurality of information blocks.

17. The UE of claim 14, further comprising:
storing, when the target cell has been determined to be a suitable cell, data from the first information block in the database.

18. The UE of claim 14, further comprising:
determining the UE is in a state of motion; and
clearing the database.

\* \* \* \* \*